United States Patent [19]
Cursolle et al.

[11] Patent Number: 5,822,126
[45] Date of Patent: Oct. 13, 1998

[54] HELMET WITH NIGHT-VISION DEVICE PROVIDING OPTIMIZED SAFETY AND ERGONOMY

[75] Inventors: Jean-Pierre Cursolle, Merignac; Jean-Michel Francois, Talence; Jean-Pierre Gerbe, Pessac; Patrick Lacroux; Denis Plantier, both of Bordeaux, all of France

[73] Assignee: Sextant Avionique, Velizy Villacoublay, France

[21] Appl. No.: 773,130

[22] Filed: Dec. 26, 1996

[30] Foreign Application Priority Data

Dec. 26, 1995 [FR] France .................................. 95 15487

[51] Int. Cl.⁶ .................................................. G02B 27/14
[52] U.S. Cl. .............................. 359/630; 359/632; 345/8
[58] Field of Search .................................... 359/630, 631, 359/632, 633; 345/7, 8

[56] References Cited

U.S. PATENT DOCUMENTS

| | | | |
|---|---|---|---|
| 4,170,042 | 10/1979 | Aileo . | |
| 4,600,271 | 7/1986 | Boyer et al. . | |
| 4,697,879 | 10/1987 | Gerbe . | |
| 4,761,056 | 8/1988 | Evans et al. .............................. | 359/631 |
| 5,050,962 | 9/1991 | Monnier et al. . | |
| 5,172,222 | 12/1992 | Plantier et al. . | |
| 5,243,450 | 9/1993 | Gerbe et al. ............................... | 359/13 |
| 5,254,852 | 10/1993 | Filipovich et al. ....................... | 250/214 |
| 5,260,829 | 11/1993 | Cantabloube et al. ................... | 359/630 |
| 5,453,854 | 9/1995 | Gerbe ......................................... | 359/13 |
| 5,453,877 | 9/1995 | Gerbe et al. ............................. | 359/633 |
| 5,572,203 | 11/1996 | Golia et al. ............................... | 359/630 |
| 5,581,806 | 12/1996 | Capdepuy et al. ....................... | 359/632 |
| 5,646,783 | 7/1997 | Banbury .................................... | 359/630 |
| 5,646,784 | 7/1997 | Wilson ...................................... | 359/632 |
| 5,646,785 | 7/1997 | Gilboa et al. ............................ | 359/632 |

FOREIGN PATENT DOCUMENTS

| | | |
|---|---|---|
| 0 384 880 | 8/1990 | European Pat. Off. . |
| 0 395 570 | 10/1990 | European Pat. Off. . |
| 0 481 860 | 4/1992 | European Pat. Off. . |
| 0 657 111 | 6/1995 | European Pat. Off. . |
| 2 070 298 | 9/1971 | France . |
| 2 289 072 | 5/1976 | France . |
| 2 391 664 | 12/1978 | France . |
| 974901 | 11/1960 | United Kingdom . |
| 2 022 989 | 12/1979 | United Kingdom . |
| WO 95/28100 | 10/1995 | WIPO . |

*Primary Examiner*—Loha Ben
*Attorney, Agent, or Firm*—Oblon, Spivak, McClelland, Maier & Neustadt, P.C.

[57] ABSTRACT

The invention relates to a pilot's helmet with a tinted visor that can be locked in raised position during nighttime use by a device using spring-loaded balls, and that can be lowered manually, or automatically when the pilot ejects thanks to a spring-loaded system tending to close the visor.

17 Claims, 7 Drawing Sheets

HELMET WITH NIGHT-VISION DEVICE PROVIDING OPTIMIZED SAFETY AND ERGONOMY

BACKGROUND OF THE INVENTION

The present invention relates to a helmet providing night-vision and optimized safety and ergonomy.

DESCRIPTION OF THE PRIOR ART

Helmets worn by military aircraft pilots carrying out night missions generally include a night-vision device that provides electronic light intensification. Early night-vision devices were of "binocular" type and therefore large in size. More recent models are of the "monocular" type that are more compact and thinner owing to the use of mirrors to deflect the light paths. This compactness offers the advantage of enabling the pilot's helmet to be fitted with a visor that can be pulled down to protect his face in the event of ejection—without having to remove the night-vision device first. Another advantage is that the monocular is light, which is important since its center of gravity is offset from the axis of rotation of the pilot's head; the torque it produces on the head during the acceleration of ejection is within acceptable limits.

The disadvantage of fitting the monocular on the visor is that the pilot is then obliged to look permanently through the visor. In the case of night-only missions, the visor could be made of clear material with very little light attenuation (about 5%). However, in the case of missions that start at dawn or dusk, a tinted visor is essential to protect the pilot from temporary blinding; if the mission continues into darkness such a visor attenuates the light far too much (about 75%).

Night-vision devices are equipped with a combiner, an optical device enabling the images produced by the night-vision device to be superimposed on those coming directly from outside the aircraft. For the comfort of the pilot the combiner must be equipped with a dioptric correction device to adapt it to his particular eyesight, and the attenuation of the reflected and transmitted light in the device must be optimized.

For night-vision devices with two light paths (direct and intensified), simple dioptric adjustment, of the type used in night-vision binoculars, is insufficient because the direct path is not corrected. The pilot then sees two images whose planes are at different distances, resulting in discomfort and eye strain, particularly during long missions.

Since night-vision devices include a combiner, to reduce the size without reducing the optical field, they can not be used while wearing normal glasses; the use of contact lenses resolves the problem of size, but these cannot be worn for extended periods on military aircraft.

Furthermore, in the case of missions during which the ambient luminosity varies greatly (missions including flying both at night and in full daylight or twilight), the difference between the luminance of the intensified image and that of the landscape viewed through the combiner can be uncomfortable for the user, and frequently no compromise, depending on the ratio of the reflection and transmission coefficients of the combiner, may be suitable.

Night-vision helmets, such as those used by combat aircraft pilots, include a number of devices, such as a light intensifier, that require an electrical power supply, usually in the form of batteries whose autonomy is of several hours, ten hours at most. As combat mission durations are often short, batteries tend to be re-used over a number of missions for reasons of economy. The batteries might then become exhausted during a mission, in which case they have to be immediately replaced.

In known helmets, the batteries are in a rather large pack usually attached to the outside of the helmet. Such helmets have a raisable visor that protects the pilot's face during ejection. This visor must be raised out of the way during battery replacement, which is an undesirable complication. Furthermore, in the event of ejection, the batteries in their pack must be released from the helmet, owing to their inertia on the side of the helmet.

SUMMARY OF THE INVENTION

The object of the present invention is a helmet with a night-vision device that is ergonomic and comfortable to use, suitable for both nighttime-only missions and missions including periods of daylight and darkness, without any substantial degradation of night-vision. The helmet can be easily personalized to adapt it to the eyesight of the user, it provides optimal luminosity during the day and at night, and its weight is as balanced as possible.

The helmet according to the invention includes a raisable tinted visor and an interchangeable combiner.

In a variant of the invention, said raisable tinted visor includes means for locking in its raised (open) position and means for locking in its lowered (closed) position, in addition to a system tending to move said visor into closed position, said visor being raised during nighttime use, lowered manually in daylight, or lowered automatically in the event of ejection of the pilot.

One advantageous characteristic of the invention is that the electrical power supply device of its night-vision device is a battery pack made integral with the helmet, preferably near the bottom of the helmet on the opposite side from the audiophonic connector.

BRIEF DESCRIPTION OF THE DRAWINGS

The invention will be better understood and other advantages and characteristics will become clear on reading the following description of an embodiment, taken only as a non-limitative example, making reference to the appended figures, of which.

DESCRIPTION OF THE PREFERRED EMBODIMENT

Figure 1:
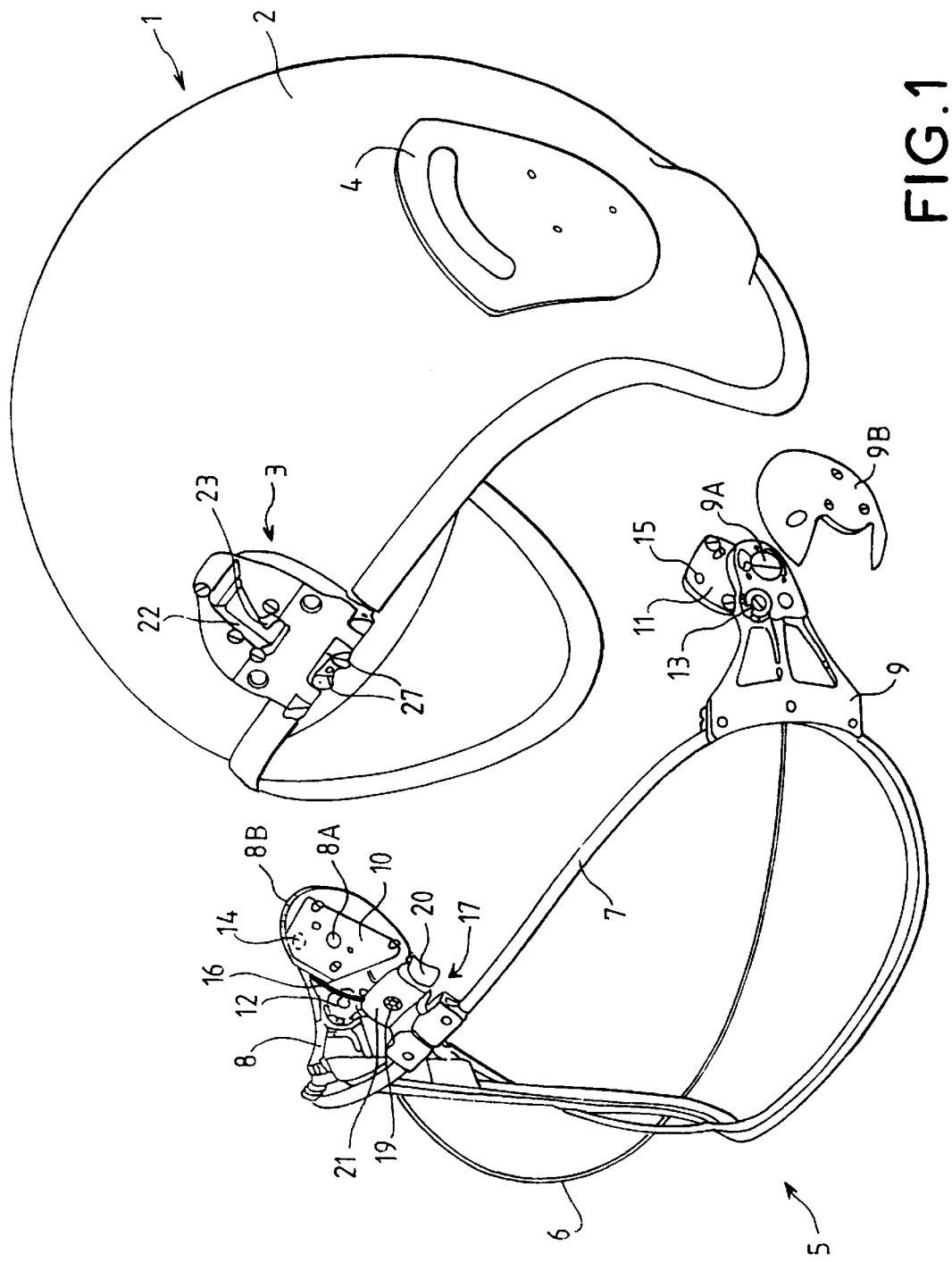
FIG. 1 is an exploded perspective view of a helmet according to the invention, showing its raisable visor.
Figure 2:
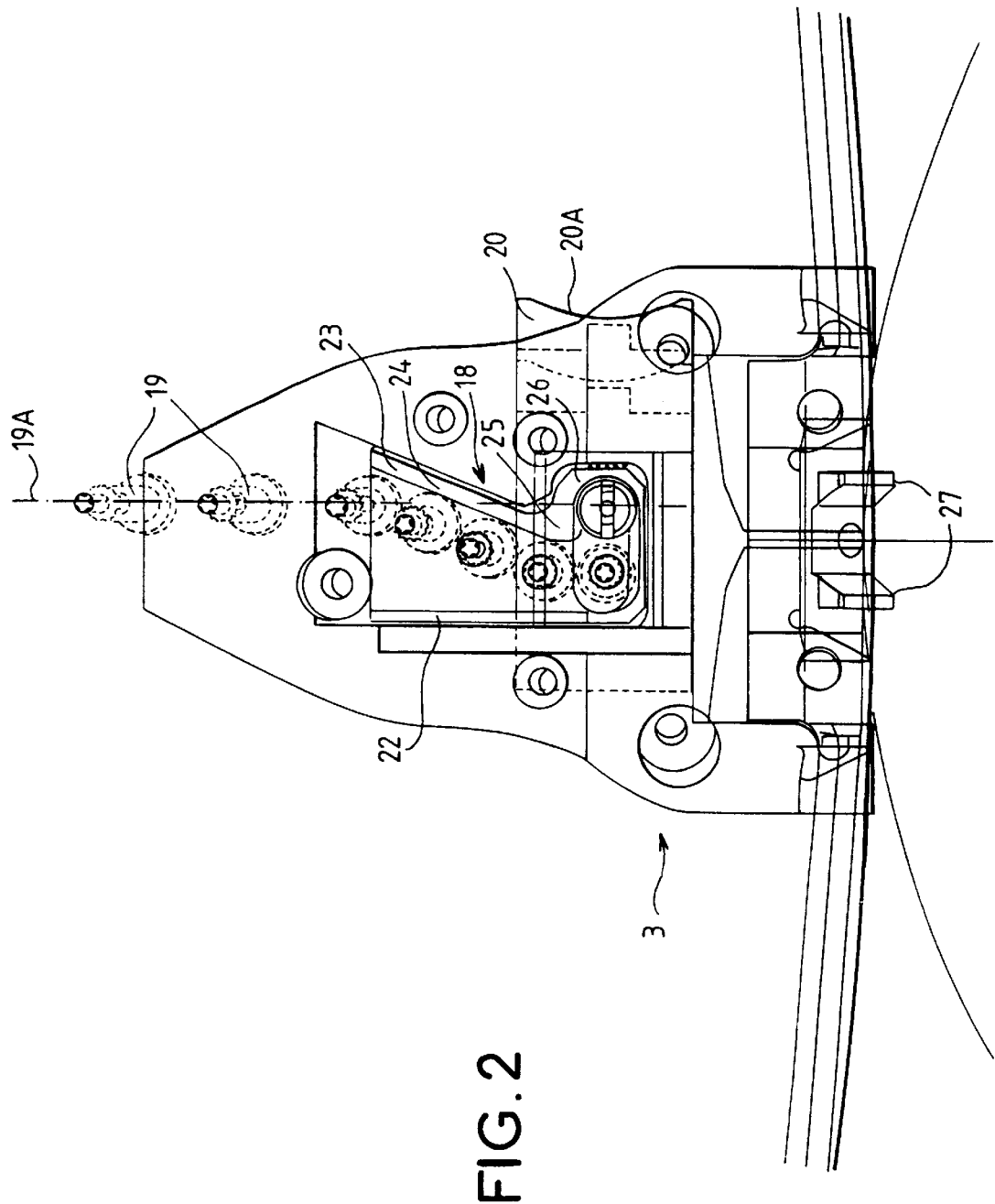
FIG. 2 is a detailed drawing of part of the helmet of FIG. 1, illustrating the method of locking its visor in closed position.

FIGS. 1 and 2 show only the parts of the helmet 1 necessary for the description of the visor of the helmet according to the invention. In particular, the internal shell of the helmet is not shown.

At the upper front edge of the external shell 2 of the helmet 1, on its external face, there is a plate 3 used to mount a night-vision device 30A mounted via mounting leg 30B and to lock the visor when it is lowered. Supports 4 for the visor pivots are fitted on each side of the shell 2, substantially opposite the ears of the user (only one of these supports is visible in the figure).

The visor 5 includes, as usual, a curved protective screen 6 mounted in a frame 7. The sides of the frame 7 are connected to stirrups 8, 9 used to attach it to the supports 4 with a rotation limited to about 90° and blocked at the limits of rotational travel. The axles of the stirrups 8 and 9 are respectively referenced 8A, 9A. The stirrups 8, 9 are connected to counter-plates 10, 11 that are interposed between these stirrups and the supports 4, and fix them onto the latter. The ends of the stirrups 8, 9 are enclosed by caps 8B, 9B. Hemispherical recesses 14, 15 are made in the faces of the counter-plates 10, 11 facing towards the stirrups 8, 9. These recesses engage spring-loaded balls 12, 13 fitted respectively in the stirrups 8, 9, when the visor 5 is fully raised, i.e. when it reaches the upper end of its rotational travel. The diameter of these hemispherical recesses is of course substantially the same as that of the spring-loaded balls 12, 13. The characteristics of the springs used to force the balls 12, 13 into the recesses 14, 15 are chosen such that the visor 5 is held firmly in the raised position, yet enabling the visor to be pulled down manually without excessive effort or, to close automatically, when the visor is open, in the event of ejection, as described herein below.

Springs are mounted round the axles of rotation 8A, 9A in such a manner as to exert a force on the visor tending to close it (only the spring 16 associated with the axle 8A is shown in the drawing). However, this force is insufficient to overcome the action of the spring-loaded balls 12, 13 holding the visor in its raised position. This holding force is overcome only when the pilot wearing the helmet is subjected to strong upward acceleration during ejection.

The upper middle part of the frame 7 carries a locking hook 17 that comes into contact with a catch ramp 18 built into the plate 3. The hook 17 is in the form of a cylindrical stud 19 mounted on the body 20 of a spring-loaded push-button that can slide longitudinally along the inside of a spring case 21, this case being mounted on the frame 7 such that the body of the push-button 20 slides parallel to the axles 8A, 9A. The stud 19 is fixed to the body 20, perpendicular to the direction of movement of this body in the case 21. In the rest position of the body 20 (visor raised, no pressure on the push-button), this body projects from the spring case, towards the right in FIG. 2 (in this figure, the surface 20A of the body 20 which the user presses to release the catch is on the right hand side of this body).

The catch ramp 18 with which the stud 19 comes into contact is in the form of a slot that lies on the path of the stud 19 as it nears the end of closing travel. There is sufficient clearance between the bottom surface of this slot and the end of the stud 19 to enable free movement of the stud in the slot. One of the sides 22 of this slot (on the left in FIG. 2) is flat and parallel to the path 19A of the axis of the stud 19 at the end of this slot. This side 22 serves as a stop for the stud 19 when the body 20 is pushed as far as possible into its case 21 to disengage the visor from the catch. The opposite side 23 of said slot, perpendicular to the bottom face of this slot, forms a ramp against which the stud 19 presses: when the visor is lowered the stud 19 meets this side 23 at the point of entry 24 of said slot and is pushed towards the left in FIG. 2, drawing the body 20 into the case 21 until the stud 19 passes over the "edge" 25. At this point the force exerted by the internal spring of the push-button forces the stud into the recess 26, perpendicular to the axis 19A, at the end of the side 23. The stud 19 is then trapped, practically in its rest position on the axis 19A. To unlock the visor and raise it, the wearer presses fully on the face 20A of the push-button 20 to release the stud 19 from the recess 26, then pushes the visor upwards until the spring-loaded balls 12, 13 engage the recesses 14, 15.

Near the upper front edge of the plate 3 there are two projections 27, located symmetrically about the axis of the plate 3. When the visor is fully lowered, a boss (not shown) on the visor whose shape corresponds to the space between these projections 27 moves between them thus immobilizing the visor laterally.

Figure 3:
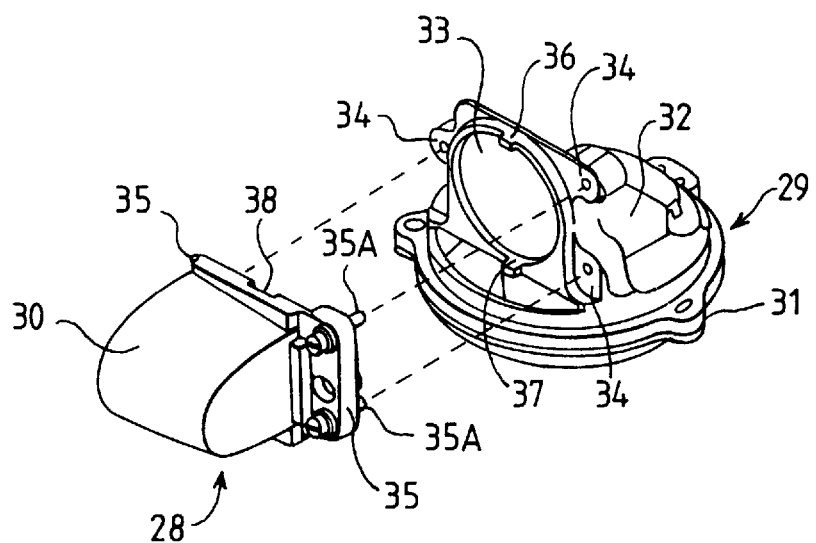
FIG. 3 is an exploded perspective view of the combiner of the helmet of FIG. 1.
Figure 4:
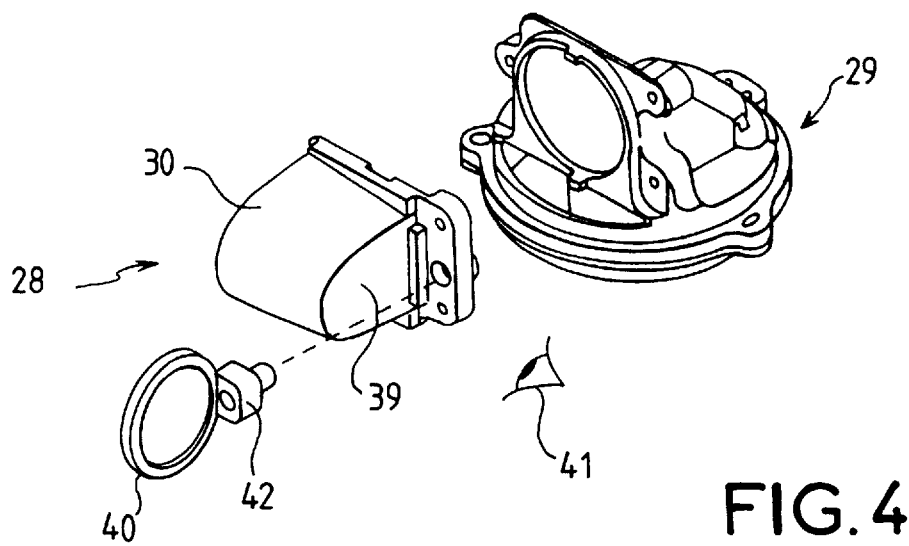
FIGS. 4 and 5 are exploded perspective views of the combiner of the FIG. 3 showing the fitting of its dioptric adaptation lens.
Figure 5:
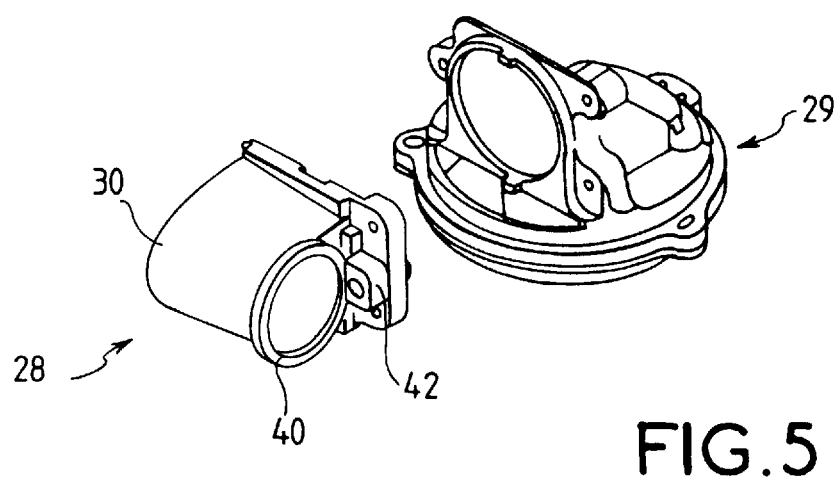

The combiner 28, shown in FIGS. 3 to 5, is mounted in front of the ocular 29 of the night-vision device. When this night-vision device is of binocular type it has, of course, two of these combiners.

The ocular 29 includes a ring 31 that is fixed on the night-vision device, and a optical system 32 that provides 90° light deflection, such as a prism whose entry and exit faces are perpendicular. The face 33 of the optical system 32, on which the combiner 30 is mounted, is for example circular and has lugs 34 on its edge used to fasten the combiner. The contact surfaces of these lugs are precision-ground to provide a positioning reference plane for the combiner 30. This combiner includes brackets 35 that are fastened, for example by screws, on the contact surfaces of the lugs 34. The contact surfaces of the brackets 35 are of course also ground.

The optical system 32 also includes a device to prevent the combiner 30 from rotating (with respect to the optical axis of the face 33) on the edge of the face 33. As shown in the figure, this rotation prevention device may be, for example, two projections 36, 37, diametrically opposite each other, that engage corresponding slots in the face of the combiner 30 (only the slot 38, corresponding to the projection 36, is visible in the drawing). The lateral faces of the projections 36, 37 and the corresponding faces of the slots of the combiner 30 are of course precision-ground to provide reference faces for the rotational positioning of the combiner 30. The holes in the brackets 35 in which the combiner's fastening screws 35A fit are sufficiently large to enable this rotational adjustment.

In this way it is easy to interchange different combiners while ensuring their perfect optical positioning relative to the optical system 32 (that is fixed definitively on the night-vision device).

As shown in FIGS. 4 and 5, an adapting lens 40 is mounted in front of the face 39 of the combiner 30, the face 39 being the one viewed directly by the user 41. The lens 40 is mounted in a manner that enables easy removal, in order to be able to interchange it easily to adapt the combiner to different users. As shown in the figure, the lens 40 can have a lug 42 that is screwed onto the bracket 35 of the combiner 30. Other systems for mounting the lens 40, such as clips, could be used.

Figure 7:
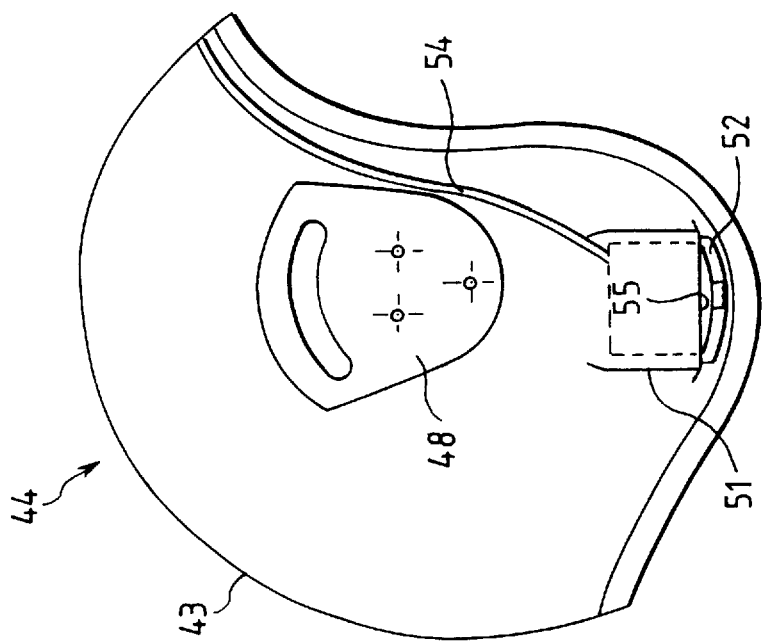
FIGS. 6 and 7 are respectively front and side views of a helmet according to the invention showing the electrical power supply device.
Figure 6:
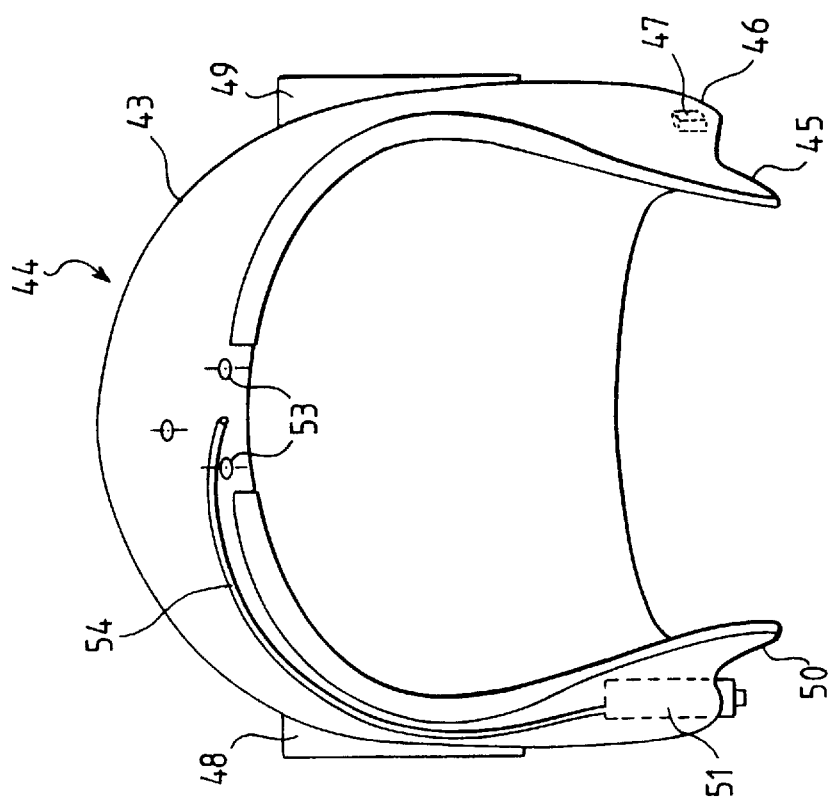

FIGS. 6 and 7 show only the external shell of the helmet according to the invention, with the items of the invention that are built into this helmet.

The external shell 43 of the helmet 44 of the invention is made using the same process as for known helmets, generally injection molding of a hot-melt material reinforced by fibers such as glass fiber.

The shell 43 includes, near the lower edge 45 of one of its sides, for example the left-hand side 46, an audiophonic connector 47 used to connect the helmet's microphone(s), sensor(s) and loudspeaker(s) to the audio amplifier equipment of the aircraft in which the helmet 44 is used. The drawing shows the pivot supports 48, 49 of the helmet's visor (not shown).

The lower edge 50 of the helmet 44 includes a molded housing 51 to receive a removable battery pack 52 (batteries not shown) providing power for the light intensifier (not shown) of the night-vision device fixed to the shell 43 at the fastening points 53 located on the upper part of the helmet near its front edge. The drawing shows the power supply wire 54 that electrically connects the batteries to the night-vision device. This wire is fixed on the inside surface of the shell 43 and is fitted with suitable connectors on its ends. The housing 51, having the same shape as the battery pack 52 that it holds, has an opening 55 at the bottom, through which the battery pack 52 is inserted.

Figure 8:
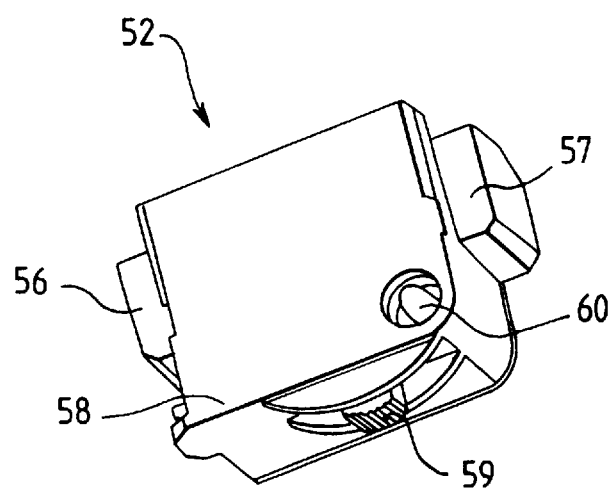
FIG. 8 is a perspective view of a battery unit that can be inserted into the helmet of FIGS. 6 and 7.
Figure 9:
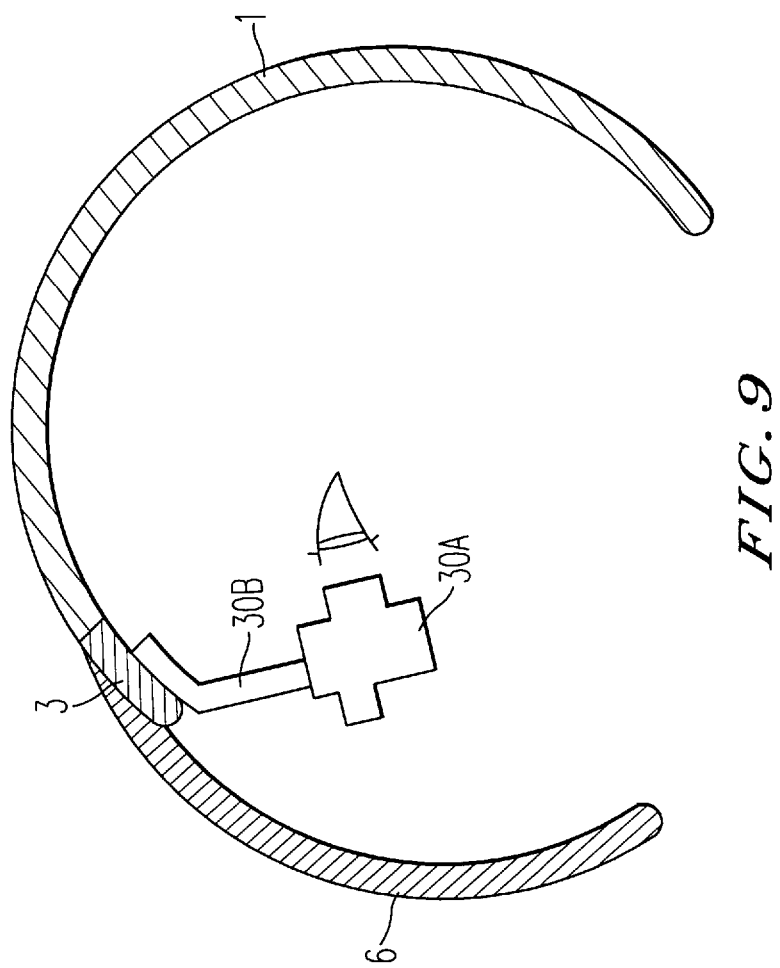
FIG. 9 shows the mounting of the night vision device.

The battery pack 52 (FIG. 8) has, for example, a parallelepiped shape. On two of its faces it has fastening bosses 56, 57 that click into the housing 51. Means (not shown) are provided in the housing 51 to release the battery pack so that it can be removed from its housing. The lower part 58 of the battery pack 52 projects slightly from the housing 51 and includes a switch 59, easily accessible to the user when the battery pack 52 is in place in its housing. This switch 59 is advantageously of three-position type: power on/power off/battery test. The battery test is advantageously performed in a known manner, with a display device such as an electro-luminescent diode (LED) 60 near the lower part 58 of the battery pack 52, so that is easily visible by the user.

In this way, the invention provides an advantageous weight balance in the helmet: the battery pack 52 is mounted near the bottom of the helmet and the night-vision device near the top, which keeps the center of gravity nearer the geometric center than in the known helmets. The invention also provides for easy replacement of the battery pack, convenient access to the battery on/off/test switch and display of the battery charge status.

What is claimed is:

1. Helmet with night-vision device comprising:
   a catch combiner mounting assembly provided on a helmet for removably mounting a catch combiner to an optical system of a night-vision device.

2. Helmet according to claim 1, wherein said catch combiner mounting assembly further comprises:
   a reference plane formed between said catch combiner and an ocular of said optical system; and
   a reference for rotational adjustment formed between said catch combiner and said ocular of said optical system.

3. Helmet according to claim 2 including a removable dioptric adaptation lense mounted adjacent to said catch combiner.

4. Helmet according to claim 1 further comprising an electrical power supply for said night-vision device, mounted in a pack containing batteries and integrated in said helmet.

5. Device according to claim 4, wherein said battery pack is mounted in the lower part of the external shell of said helmet.

6. Device according to claim 5, wherein said batter pack is located on a side opposite from a side of said helmet that includes an audiophonic connector.

7. Device according to claim 4, wherein said battery pack click-fits into a housing formed in the external shell of said helmet.

8. Device according to claim 4, wherein said battery pack further comprises a switch to switch the power on and off.

9. Device according to claim 8, wherein said switch also includes a battery test position.

10. Device according to claim 9, wherein said battery pack further comprises a display device to show the battery charge status.

11. Helmet according to claim 1 further comprising a tinted visor pivotally mounted to said helmet wherein said visor can close when said night-vision device is in use by a wearer.

12. Helmet with night-vision device comprising:
    a helmet with a night vision device;
    a tinted visor pivotally mounted to said helmet wherein said visor can close when said night-vision device is in use by a wearer.

13. Helmet according to claim 12, wherein said helmet further comprises means for locking said tinted visor in a raised position and means for locking said tinted visor in a lowered position; and
    an automatic visor lowering system for lowering said visor into the closed position upon ejection of a wearer.

14. Helmet according to claim 13, wherein said means for locking the visor in a raised position comprises at least one spring-loaded ball that engages a corresponding recess.

15. Helmet according to claim 13, wherein said means for locking the visor in a lowered position comprises a catch.

16. Helmet according to claim 15, wherein said catch comprises a stud mounted on said visor that engages a ramped slot formed in a support of said night-vision device.

17. Helmet according to claim 13, wherein said automatic visor lowering system further comprises at least one spring whose force is insufficient to overcome the retaining force exerted by said means for locking the visor in a raised position.

* * * * *